Sept. 12, 1967  C. A. SECKERSON  3,340,704
FLEXIBLE COUPLING
Filed Oct. 14, 1965

INVENTOR
Clifford Alexander Seckerson
by Philip C. Parker
Attorney

United States Patent Office 3,340,704
Patented Sept. 12, 1967

3,340,704
FLEXIBLE COUPLING
Clifford Alexander Seckerson, Iver Heath, England, assignor to United-Carr Incorporated, Boston, Mass., a corporation of Delaware
Filed Oct. 14, 1965, Ser. No. 495,967
Claims priority, application Great Britain, Oct. 26, 1964, 43,563/64
3 Claims. (Cl. 64—15)

ABSTRACT OF THE DISCLOSURE

A resilient clip for coupling two shafts together whereby rotation of one shaft is transmitted to the other. The clip is of U-shape and has two spaced limbs. Each of the limbs has a tongue sheared therefrom providing an aperture for receipt of one of the shafts and a free end portion extending beyond the apertures so formed. Each of the tongues is reversely bent from the limb from which it is sheared and provides a bearing surface which engages a shaft received in the aperture and clamps it against the free end of the limb.

---

The present invention relates to a resilient linkage clip which is particularly but not exclusively suitable for coupling two shafts together so as to transmit rotation from one shaft to the other and allow limited misalignment and universal movement between the shafts.

It is an object of the present invention to provide a clip which will couple two shafts so that rotation of one shaft is transmitted to the other shaft while allowing for both misalignment of the shafts and universal movement therebetween.

It is a further object of the present invention to provide such a linkage clip which is also both cheap to manufacture and easy to assemble.

With these objects in view and in accordance with the invention there is provided a resilient clip for coupling two shafts together so as to enable the transmission of rotation from one shaft to the other through the clip and limited universal movement between the shafts, each shaft having a flat adjacent one end thereof and the clip being generally of U-shape and having a web portion and two limbs each of which has a tongue sheared therefrom so as to form an aperture in the limb for the reception of one of the shafts and beyond the aperture a free end portion and the tongue in each limb being outwardly and reversely bent with respect to the limb from which it is sheared so as to provide a bearing surface adapted to engage the flat on a shaft and clamp the shaft against the end portion of the limb.

Figure 1:
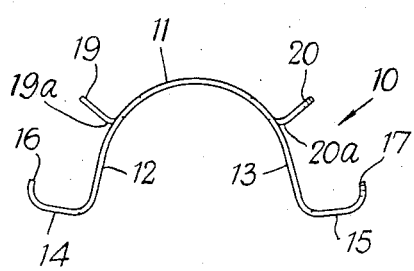
Figure 2:
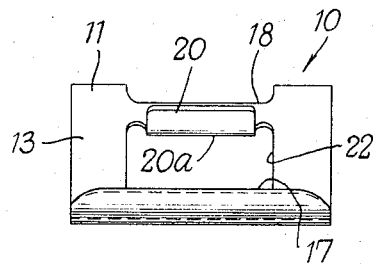
Figure 3:
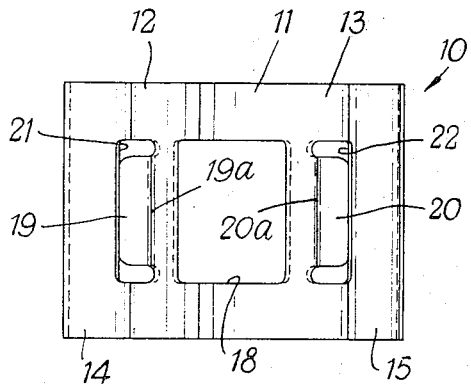
Figure 5:
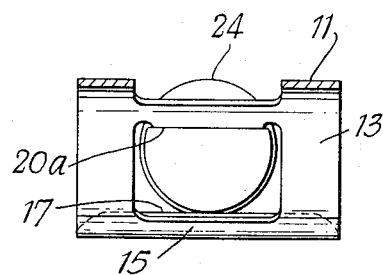
Figure 4:
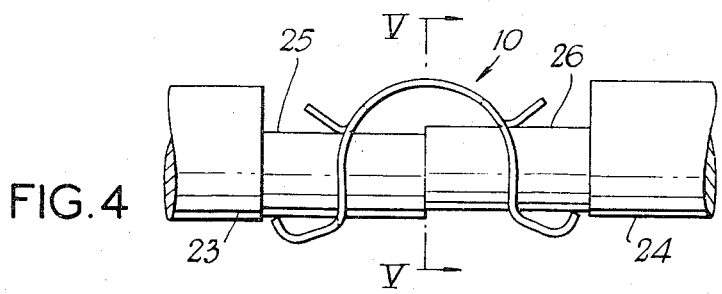

A preferred form of the invention will now be described with reference to the accompanying diagrammatic drawings, in which:

FIGURES 1, 2 and 3 are respectively a side elevation, end elevation and underplan of a flexible coupling, FIGURE 4 is a side elevation showing two shafts linked by the coupling of FIGURES 1 to 3, and FIGURE 5 is a section on the line V—V of FIGURE 4.

In FIGURES 1 to 3 a resilient linkage clip is indicated generally at 10.

The clip 10 is formed from a single strip of metal, such as spring steel, which is rendered resilient and preferably rustproof after being manufactured to the shape shown.

The clip 10 is generally U-shaped and comprises a curved web 11 and two limbs 12 and 13 which diverge outwardly from the web 11. At the end of each limb 12 and 13 there is a reversely directed end portion 14 and 15 respectively the free end edges 16 and 17 of which form shaft-engaging edges.

An aperture 18 is sheared from the web 11 so as to increase its flexibility and two resilient tongues 19 and 20 respectively are sheared from the limbs 12 and 13 so as to leave apertures 21 and 22 respectively in the limbs. The tongues 19 and 20 are bent adjacent their roots so as to extend outwardly of the limbs and backwardly in the general direction of the web and provide bearing surfaces 19a and 20a respectively which face the end edges 16 and 17 respectively of the limbs 12 and 13.

As shown in FIGURE 4 the clip 10 is used to link two rotatable shafts 23 and 24 in such a manner that rotation can be transmitted from one shaft to the other through the clip while allowing limited universal movement between the shafts.

Each shaft 23 and 24 is formed at one end with a flat 25 and 26 respectively and in order to attach the clip 10 to the shafts the limb 12 is passed over the end of the shaft 23 so that the end of the shaft extends through the aperture 21 with the bearing surface 19a of the tongue 19 bearing against the flat 25. The end of the limb 13 is then forced towards the limb 12 bending the web 11, until the end of the shaft 24 can be inserted through the aperture 22 approximately in axial alignment with the shaft 23.

In the assembled position, which is shown in FIGURE 4, the clip is under permanent compression so that the shafts 23 and 24 are clamped between the end edges 16 and 17 of the limbs and the tongues 19 and 20. The edges 16 and 17 thus tend to bite into the shafts and resist removal of the shafts from the clip.

The tongues 19 and 20 are approximately the same width as the flats 25 and 26 and thus ensure that rotation of one of the shafts 23 or 24 is transmitted through the clip 10 to the other shaft.

If one of the shafts moves slightly out of axial alignment with the other shaft, as shown in FIGURE 4, the displacement is compensated by the flexibility of the web 11 of the clip without any interference in the transmission of rotation. Similarly, any angular displacement of one shaft relative to the other is taken up by the resilience of the end portions 14 and 15 of the limbs which ensure that the shafts are gripped firmly between the end edges 16 and 17 and the tongues 19, 20 at all times.

The clip 10 thus provides an effective coupling which enables rotation to be transmitted from one shaft to another and allows considerable tolerance in the alignment of the shafts.

The foregoing description discloses only a single embodiment of the invention and it will be understood that modifications may be made, for instance the end portions of the limbs of the clip need not be outwardly and reversely bent, without departing from the scope and spirit of the invention.

What I claim is:

1. A resilient clip for coupling two shafts together so as to enable the transmission of rotation from one shaft to the other through the clip and limited universal movement between the shafts, each shaft having a flat adjacent one end thereof and the clip being generally of U- shape and having a web portion and two limbs each of which has a tongue sheared therefrom so as to form an aperture in the limb for the reception of one of the shafts and beyond the aperture a free end portion and the tongue in each limb being outwardly and reversely bent with respect to the limb from which it is sheared so as to provide a bearing surface adapted to engage the flat on a shaft and clamp the shaft against the end portion of the limb.

2. A resilient clip as claimed in claim 1, in which the web is bowed and apertured to increase its resilience, the limbs, when unstressd, are splayed apart, and the limbs are drawn toward each other under compression when the shafts are coupled together.

3. A resilient clip as claimed in claim 2, in which the said end portion of each limb is outwardly and reversely bent, each said end portion having an end edge facing the said bearing surfaces on the said tongues, the end edges being adapted to bite into the shafts and resist withdrawal of the clip from the shafts.

References Cited

UNITED STATES PATENTS

| | | | |
|---|---|---|---|
| 2,246,750 | 6/1941 | Murphy | 64—15 |
| 2,724,251 | 11/1955 | Weaver | 64—15 |
| 2,903,867 | 9/1959 | Moody | 64—15 |
| 2,971,355 | 2/1961 | Walsh | 64—15 |

FOREIGN PATENTS 570,282  1/1933  Germany.

FRED C. MATTERN, Jr., *Primary Examiner.*

HALL C. COE, *Examiner.*